US012272859B2

(12) United States Patent
Chen et al.

(10) Patent No.: US 12,272,859 B2
(45) Date of Patent: Apr. 8, 2025

(54) FOLDABLE SATELLITE DISH

(71) Applicant: A&C Future Inc., Newport Beach, CA (US)

(72) Inventors: Shoue Chen, Irvine, CA (US); Zhuangboyu Zhou, Santa Ana, CA (US); Sichen Li, Santa Ana, CA (US); Jiuqi Wang, Santa Ana, CA (US); Ju Gao, Newport Beach, CA (US); Han Qin, Newport Beach, CA (US); Jiayang Qin, Newport Beach, CA (US)

(73) Assignee: A&C Future Inc.

( * ) Notice: Subject to any disclaimer, the term of this patent is extended or adjusted under 35 U.S.C. 154(b) by 197 days.

(21) Appl. No.: 18/142,562

(22) Filed: May 2, 2023

(65) Prior Publication Data

US 2024/0372243 A1 Nov. 7, 2024

(51) Int. Cl.
*H01Q 1/12* (2006.01)
*H01Q 1/08* (2006.01)
*H01Q 15/16* (2006.01)

(52) U.S. Cl.
CPC ............ *H01Q 1/08* (2013.01); *H01Q 15/162* (2013.01)

(58) Field of Classification Search
CPC ........ H01Q 1/08; H01Q 1/1235; H01Q 1/528; H01Q 15/162; H01Q 15/20
See application file for complete search history.

(56) References Cited

U.S. PATENT DOCUMENTS 6,424,314 B1 * 7/2002 Baghdasarian ...... H01Q 15/161 343/882
2009/0243955 A1 * 10/2009 Legare ..................... H01Q 1/08 343/882
2013/0069849 A1 * 3/2013 Toledo ................... H01Q 15/20 343/915
2014/0152492 A1 * 6/2014 Zimmerman ............ H01Q 1/08 29/601

* cited by examiner

*Primary Examiner* — Awat M Salih
(74) *Attorney, Agent, or Firm* — Elizabeth Yang

(57) ABSTRACT

A foldable satellite dish is provided. The foldable satellite dish has a dish reflector assembly a support housing, and a driving mechanism. The dish reflector assembly comprises four quarter circle shape dish sectors that can be folded and deployed by the driving mechanism. The foldable satellite dish can deploy and fold automatically and smoothly. All the quarter circle shape dish sectors will be secured by the driving mechanism. Compared to traditional satellite dish, the present invention is more flexible and easier to use.

15 Claims, 20 Drawing Sheets

FOLDABLE SATELLITE DISH

FIELD OF THE INVENTION

The present invention relates to a satellite dish. More so, a foldable satellite dish is introduced herein.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Recreational vehicles, such as RVs, travel trailers and camper vans, are remodifying people's lifestyles in United State. The targeted customer ranges from retired couples to young professionals. Communication, as one of the greatest marks of modern life, is significant for recreational vehicle travelers.

For travelers that commute and reside within city cellular ranges, cellular data plan will be a good choice, but for people staying in very remote areas, such as national parks, satellite internet will always be the best and the most reliable option.

Considering the limited indoor storage space of an RV, or other recreational vehicle, installing a satellite dish would be a challenging task (otherwise sacrificing aerodynamic performance when fixed on roof). As usual, a larger dish surface will be beneficial in collecting signal and offering a better Carrier to Noise (C/N) or Modulation Error Ratio (MER) reading resulting in a more robust signal during backhaul communication.

Current designs for foldable satellite dishes lack automatic deploying and folding mechanisms, and their inner surfaces are usually not even and smooth.

Hence, in order to offer a transportation space-saving satellite dish that can open automatically, the present invention is proposed.

The satellite dish structure can also be utilized as a solar cooker under emergency circumstances for travelers off grid, after its inner surface modified or coated with reflective materials like aluminum foil and magnesium oxide.

The invention can be used in villas, apartments, office buildings, mobile homes, RVs, and other outdoor areas.

SUMMARY

Illustrative embodiments of the disclosure are generally directed to a foldable satellite dish.

A foldable satellite dish, comprising a dish reflector assembly, a support housing, and a driving mechanism.

The support housing may have a bottom plate. A first vertical plate may extend upward from a first edge of the bottom plate. A first barrier panel may extend from the first vertical plate. A second vertical plate opposing the first vertical plate may extend upward from a second edge of the bottom plate. A second barrier panel may extend from the second vertical plate. The first barrier panel may be perpendicular to the second barrier panel. A third vertical plate may extend upward from a third edge of the bottom plate. A central through-hole may be provided on the third vertical plate. A first screw rod through-hole may be provided on the third vertical plate.

The driving mechanism may have a main shaft, a dam-board, a first screw rod, a main driving motor, and a screw rod driving motor. A first main shaft end may be rotatably mounted in the central through-hole and driven by the main driving motor. A second main shaft end may be provided with a first external spline tooth. A second spring pin, a third spring pin, and a fourth spring pin may be provided sequentially on the main shaft near the first external spline tooth. The dam-board may be provided with a main shaft hole and a first threaded hole. One end of the first screw rod may be rotatably mounted in the first screw rod through-hole and driven by the screw rod driving motor. Another end of the first screw rod may be threaded into the first threaded hole. The main shaft may be rotatable through the main shaft hole. The first screw rod may drive the dam-board slides along the main shaft.

The dish reflector assembly may have a central disc, a first quarter circle shape dish sector with a first ring that may match the diameter of the main shaft, a second quarter circle shape dish sector with a second ring that may match the diameter of the main shaft, a third quarter circle shape dish sector with a third ring that may match the diameter of the main shaft, and a fourth quarter circle shape dish sector with a fourth ring that may match the diameter of the main shaft. The central disc may be fixed at the second main shaft end. The first ring may have an internal spline tooth coupled to the first external spline tooth. The second ring may have a second pin hole corresponding the second spring pin. The third ring may have a third pin hole corresponding the third spring pin. The fourth ring may have a fourth pin hole corresponding the fourth spring pin.

The foldable satellite dish may have a folded state and a deployed state. In the folded state, the first quarter circle shape dish sector, the second quarter circle shape dish sector, the third quarter circle shape dish sector, and the fourth quarter circle shape dish sector may be sequentially arranged along the main shaft between the first barrier panel and the second barrier panel. In the deployed state, the second ring may be secured to the main shaft by the second spring pin, the third ring may be secured to the main shaft by the third spring pin, the fourth ring may be secured to the main shaft by the fourth spring pin.

Two edges of the first quarter circle shape dish sector may define a first pinch angle, the bisector of the first pinch angle may pass through the internal spline tooth, and the internal spline tooth may be located on a side of the first ring near the first pinch angle.

Two edges of the second quarter circle shape dish sector may define a second pinch angle, and the bisector of the second pinch angle and the axis of the second pin hole may form a 90-degree angle;

Two edges of the third quarter circle shape dish sector may define a third pinch angle, the bisector of the third pinch angle may be parallel to axis of the third pin hole, and the third pin hole may be located on a side of the third ring away from the third pinch angle.

Two edges of the fourth quarter circle shape dish sector may define a fourth pinch angle, and the bisector of the fourth pinch angle and the axis of the fourth pin hole may form a 270-degree angle.

The first quarter circle shape dish sector may be stepped and may have a first low sector and a first high sector. The radius of the first low sector may be the same as the radius of the central disc. The difference in height between the first high sector and the first low sector may be the same as the thickness of the central disc.

The second quarter circle shape dish sector may be stepped and may have a second low sector and a second high sector. The radius of the second low sector may be the same as the radius of the central disc. The difference in height between the second high sector and the second low sector may be the same as the thickness of the central disc.

The second low sector may extend a second sector support protrusion for the second ring along the main shaft in a direction away from the first quarter circle shape dish sector, and the thickness of the second sector support protrusion may be equal to the thickness of the central disc.

The inner diameter of the second sector support protrusion may be equal to the outer diameter of the first ring.

The third quarter circle shape dish sector may be stepped and may have a third low sector and a third high sector. The radius of the third low sector may be the same as the radius of the central disc. The difference in height between the third high sector and the third low sector may be the same as the thickness of the central disc;

The third low sector may extend a third sector support protrusion for the third ring along the main shaft in a direction away from the second quarter circle shape dish sector, and the thickness of the third sector support protrusion may be equal to twice the thickness of the central disc.

The inner diameter of the third sector support protrusion may be equal to the outer diameter of the second sector support protrusion.

The fourth quarter circle shape dish sector may be stepped and may have a fourth low sector and a fourth high sector. The radius of the fourth low sector may be the same as the radius of the central disc. The difference in height between the fourth high sector and the fourth low sector may be the same as the thickness of the central disc;

The fourth low sector may extend a fourth sector support protrusion for the fourth ring along the main shaft in a direction away from the second quarter circle shape dish sector, and the thickness of the fourth sector support protrusion may be equal to triple the thickness of the central disc.

A retainer ring may be provided on the third vertical plate extending in the direction away from the dam-board. The retainer ring and the central through-hole may be co-axial, and the first main shaft end rotatably may extend through the retainer ring.

A screw driving gear may be mounted on the shaft of the screw rod driving motor, a first screw slave gear may be mounted on the first screw rod. The screw driving gear may engage with the first screw slave gear.

A second screw rod through-hole and a third screw rod through-hole may be provided on the third vertical plate;

The driving mechanism may have a second screw rod and a third screw rod. The dam-board may be provided with a second threaded hole and a third threaded hole.

One end of the second screw rod may be rotatably mounted in the second screw rod through-hole. A second screw slave gear may be mounted on the second screw rod. Another end of the second screw rod may be threaded into the first threaded hole.

One end of the third screw rod may be rotatably mounted in the third screw rod through-hole. A third screw slave gear may be mounted on the third screw rod. Another end of the third screw rod may be threaded into the third threaded hole;

The first screw rod, the second screw rod, and the third screw rod drive the dam-board slides along the main shaft.

The outer surface of the retainer ring may be low frictional. An idler gear may be rotatably mounted on the outer surface of the retainer ring. A first screw slave gear may be mounted on the first screw rod. The first screw slave gear may engage with the screw driving gear and the idler gear separately. The idler gear may engage with the second screw slave gear and the third screw slave gear separately.

A main gear may be mounted on the first main shaft end. A main shaft driving gear may be mounted on the shaft of the main driving motor, and the main shaft driving gear may engage with the main gear.

A segment of the main shaft near the first external spline tooth may have a pins-holding body, a shaft section body with a first plane and a second plane, and a pin motor housing.

The second spring pin may have a second locking cap, a second spring, and a second control cable. The second locking cap may have a second hollow cap body and a second cap seat may extend outward from the bottom of the second hollow cap body. The pins-holding body may have a second pin-holding through-hole may have a second upper hole and a second lower hole. The second spring pin may be accommodated in the second pin-holding through-hole. The second upper hole may allow the second hollow cap body to pass through and prevents the second cap seat from passing through. The shaft section body may be provided with a second control cable hole passing through the first plane and the second plane. The second spring may rest between the top of the second locking cap and the first plane. A second control cable motor may be mounted on the second plane and be covered in the pin motor housing. One end of the second control cable may be mounted on the inner top surface of the second locking cap. Another end of the second control cable may pass through the second control cable hole and may be entwined around a spindle of the second control cable motor.

The third spring pin may have a third locking cap, a third spring, and a third control cable. The third locking cap may have a third hollow cap body and a third cap seat may extend outward from the bottom of the third hollow cap body. The pins-holding body may have a third pin-holding through-hole may have a third upper hole and a third lower hole. The third spring pin may be accommodated in the third pin-holding through-hole. The third upper hole may allow the third hollow cap body to pass through and prevents the third cap seat from passing through. The shaft section body may be provided with a third control cable hole passing through the first plane and the second plane. The third spring may rest between the top of the third locking cap and the first plane. A third control cable motor may be mounted on the second plane and be covered in the pin motor housing. One end of the third control cable may be mounted on the inner top surface of the third locking cap. Another end of the third control cable may pass through the third control cable hole and may be entwined around a spindle of the third control cable motor.

The fourth spring pin may have a fourth locking cap, a fourth spring, and a fourth control cable. The fourth locking cap may have a fourth hollow cap body and a fourth cap seat may extend outward from the bottom of the fourth hollow cap body. The pins-holding body may have a fourth pin-holding through-hole may have a fourth upper hole and a fourth lower hole. The fourth spring pin may be accommodated in the fourth pin-holding through-hole. The fourth upper hole may allow the fourth hollow cap body to pass through and prevents the fourth cap seat from passing through. The shaft section body may be provided with a fourth control cable hole passing through the first plane and the second plane. The fourth spring may rest between the top of the fourth locking cap and the first plane. A fourth control cable motor may be mounted on the second plane and be covered in the pin motor housing. One end of the fourth control cable may be mounted on inner top surface of the fourth locking cap. Another end of the fourth control cable may pass through the fourth control cable hole and may be entwined around a spindle of the fourth control cable motor.

A retractable rod may be coaxially mounted on a side of the central disc away from the support housing.

The second control cable motor, the third control cable motor, and the fourth control cable motor may be miniature DC motors.

These, as well as other components, steps, features, objects, benefits, and advantages, will now become clear from a review of the following detailed description of illustrative embodiments, the accompanying drawings, and the claims.

Other systems, devices, methods, features, and advantages will be or become apparent to one with skill in the art upon examination of the following drawings and detailed descriptions. It is intended that all such additional systems, methods, features, and advantages be included within this description, be within the scope of the present disclosure, and be protected by the accompanying claims and drawings.

BRIEF DESCRIPTION OF THE DRAWINGS

The drawings illustrate examples. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

The same reference numerals refer to the same parts throughout the various views of the drawings.

DETAILED DESCRIPTION OF ILLUSTRATIVE EMBODIMENTS

Figure 1:
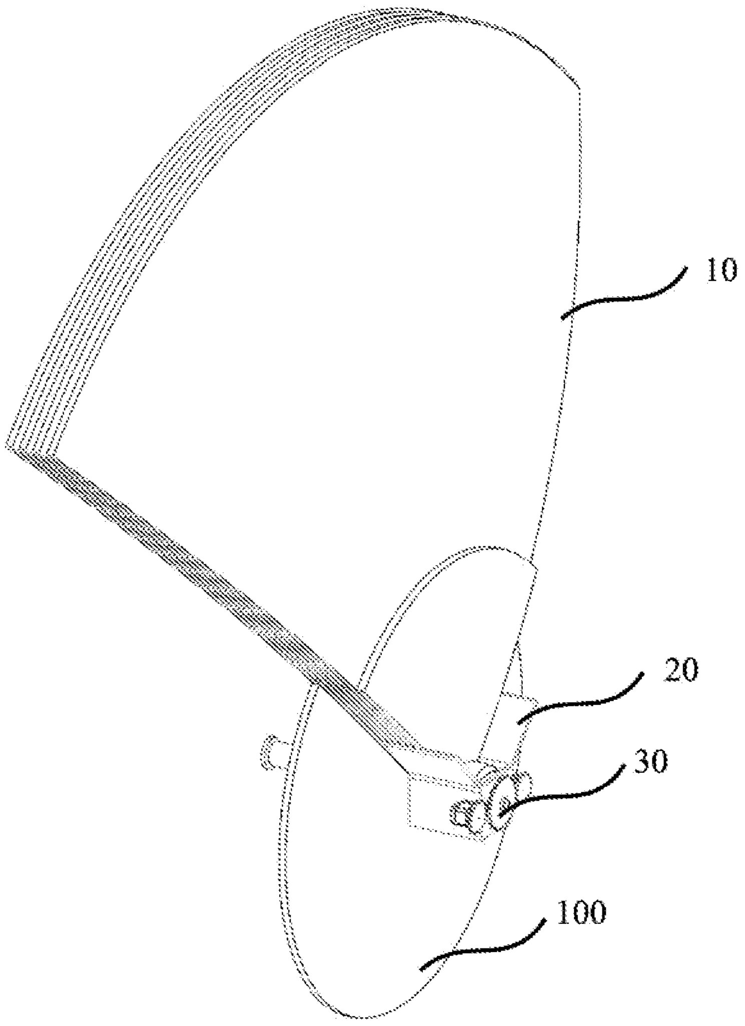
FIG. 1 is a schematic view of the invention in a folded state.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in the drawings. Furthermore, there is no intention to be bound by any expressed or implied theory presented in the preceding technical field, background, summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

FIG. 1 is a schematic view of the invention in a folded state.

Figure 2:
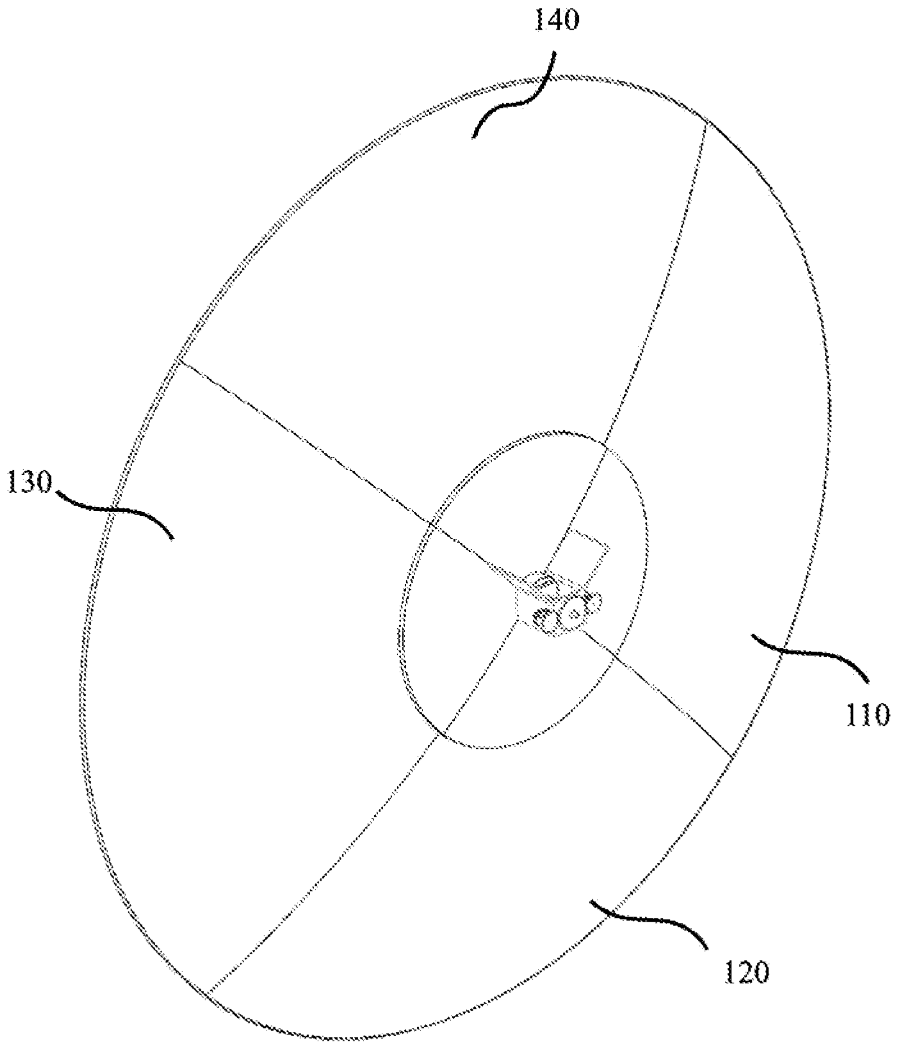
FIG. 2 is a schematic view of the invention in a deployed state.

FIG. 2 is a schematic view of the invention in a deployed state.

In this invention, an automatic folding and expansion mechanism for satellite dishes (or other similar structures) is proposed. The complete satellite dish is divided evenly (90°)

into four sectors and one central plane which is utilized to install the main (rotational) shaft and the signal-receiving device.

A foldable satellite dish has a dish reflector assembly 10, a support housing 20, and a driving mechanism 30.

Figure 3:
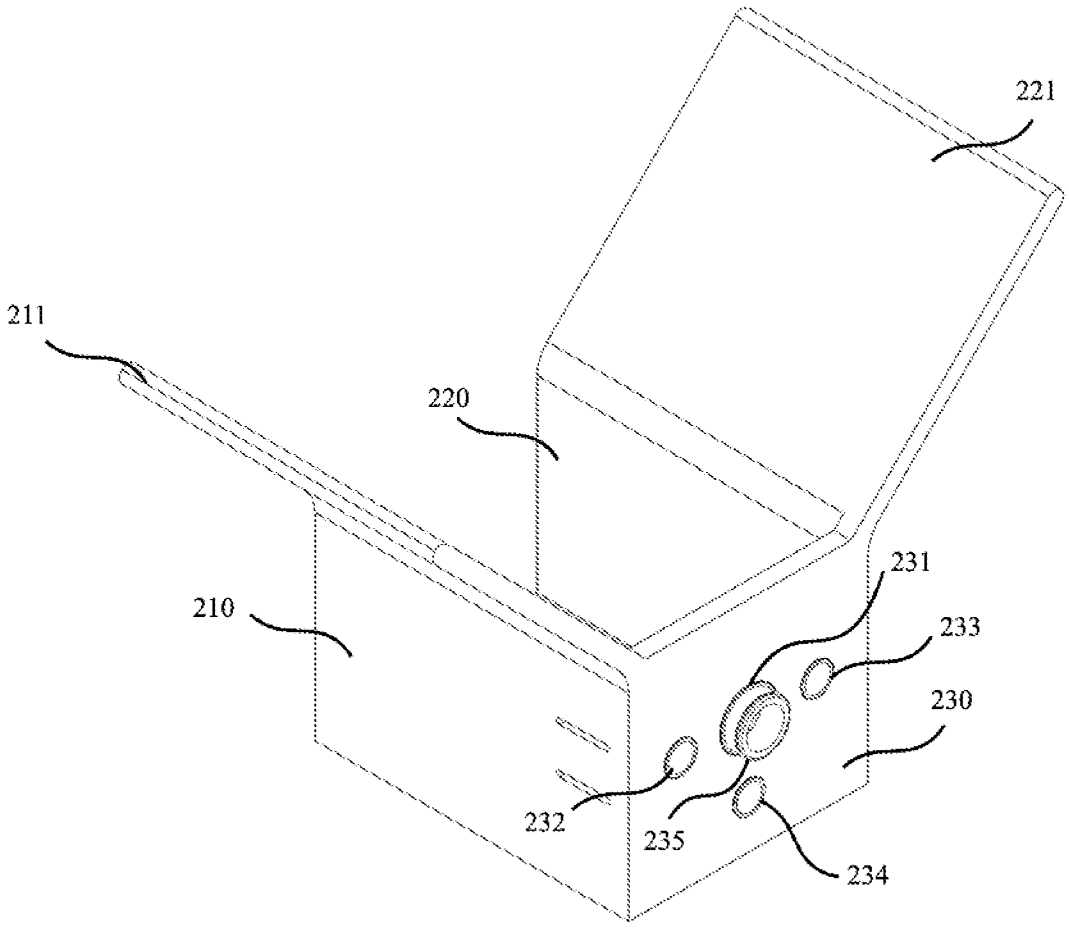
FIG. 3 is a schematic view of the support housing.

FIG. 3 is a schematic view of the support housing. The dish reflector assembly 10 and the driving mechanism 30 is embedded in the box-like support housing 20 with two barrier panels 211, 221.

The support housing 20 has a bottom plate 200. A first vertical plate 210 extends upward from a first edge 201 of the bottom plate 200. A first barrier panel 211 extends from the first vertical plate 210. A second vertical plate 220 opposing the first vertical plate 210 extends upward from a second edge 202 of the bottom plate 200. A second barrier panel 221 extends from the second vertical plate 220. The first barrier panel 211 is perpendicular to the second barrier panel 221. A third vertical plate 230 extends upward from a third edge 203 of the bottom plate 200. A central through-hole 231 is provided on the third vertical plate 230. A first screw rod through-hole 232 is provided on the third vertical plate 230.

Figure 4A:
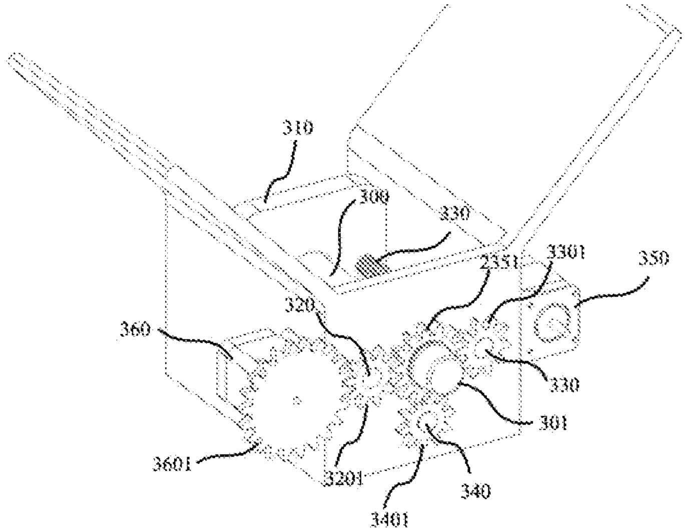
FIG. 4A is a schematic view of the support housing with the driving mechanism.
Figure 4B:
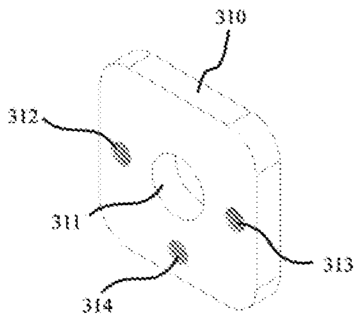
FIG. 4B is a schematic complete view of the dam-board in FIG. 4A.

FIG. 4A is a schematic view of the support housing with the driving mechanism; FIG. 4B is a schematic complete view of the dam-board in FIG. 4A.

Figure 5:
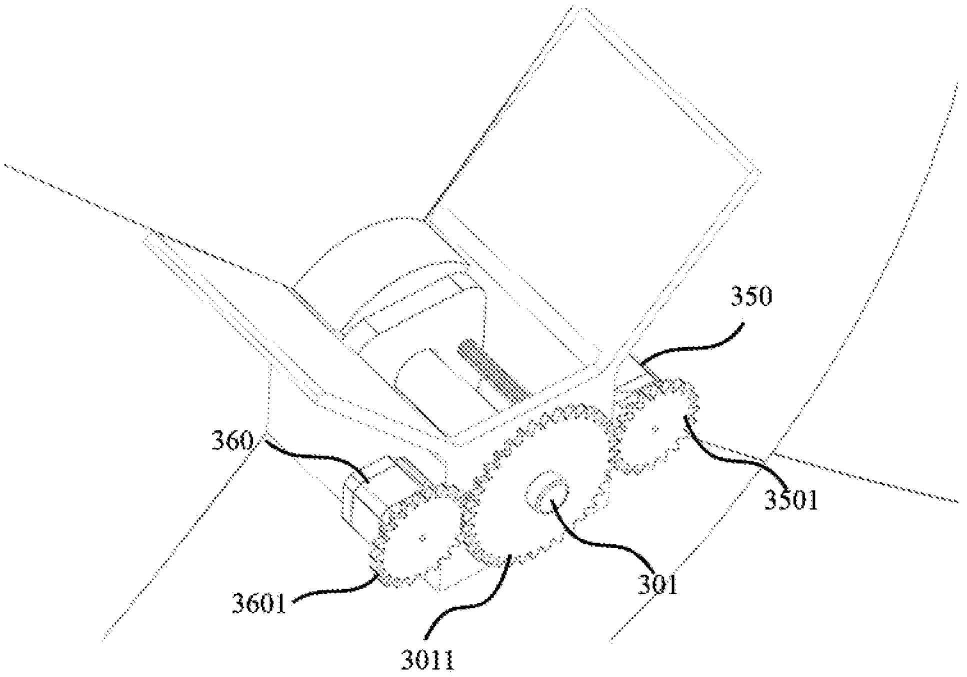
FIG. 5 is another schematic view of the support housing with the driving mechanism.

FIG. 5 is another schematic view of the support housing with the driving mechanism.

Figure 6:
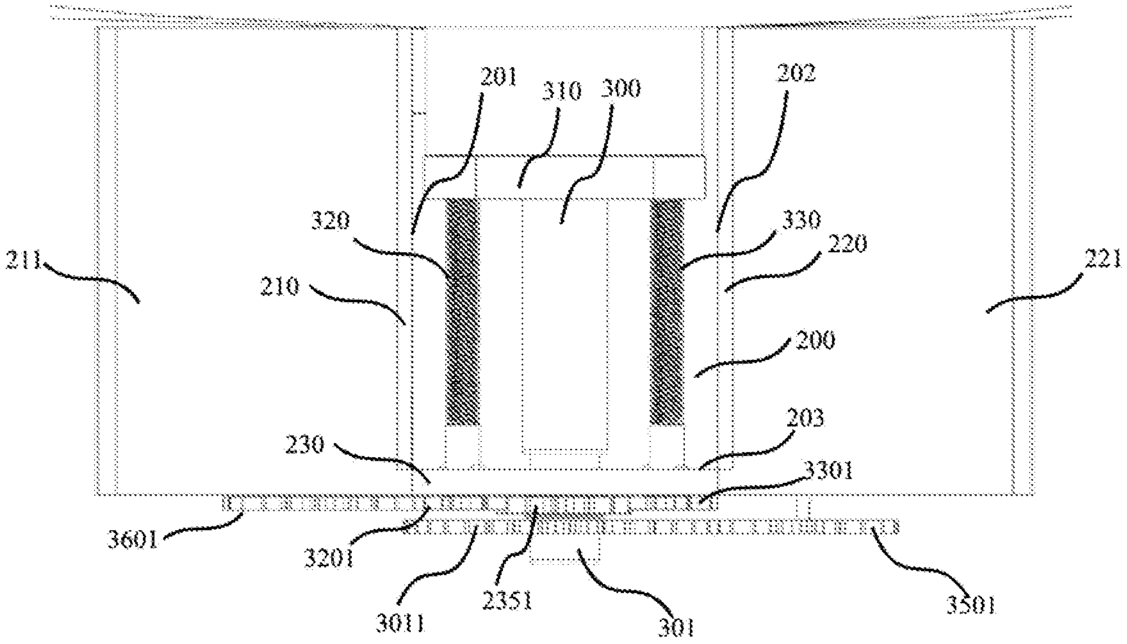
FIG. 6 is a top view of the support housing with the driving mechanism.

FIG. 6 is a top view of the support housing with the driving mechanism.

The driving mechanism 30 has a main shaft 300, a dam-board 310, a first screw rod 320, a main driving motor 350, and a screw rod driving motor 360. A first main shaft end 301 is rotatably mounted in the central through-hole 231 and driven by the main driving motor 350.

Figure 9:
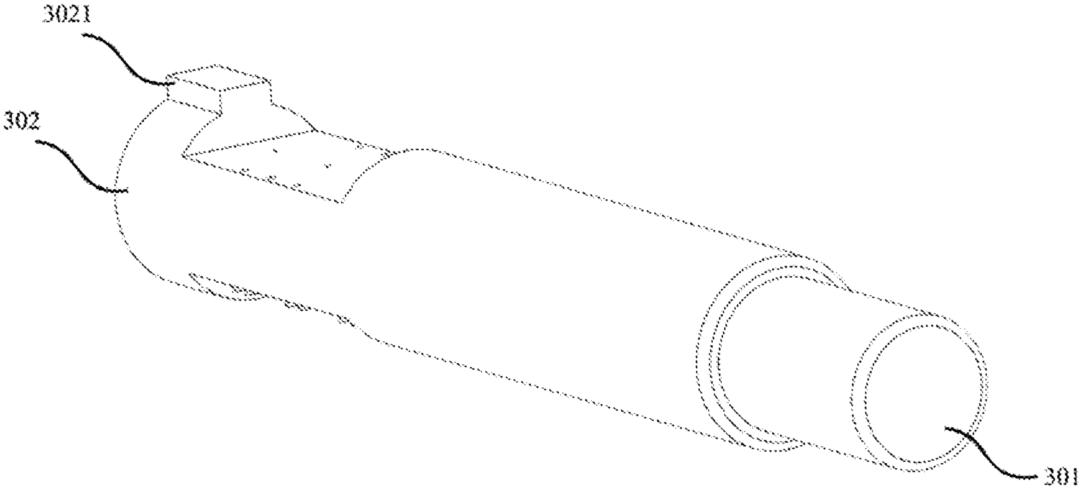
FIG. 9 is a schematic view of the main shaft.

FIG. 9 is a schematic view of the main shaft.

A second main shaft end 302 is provided with an external spline tooth 3021. A second spring pin 303, a third spring pin 304, and a fourth spring pin 305 are provided sequentially on the main shaft 300 near the external spline tooth 3021. The dam-board 310 is provided with a main shaft hole 311 and a first threaded hole 312. One end of the first screw rod 320 is rotatably mounted in the first screw rod through-hole 232 and driven by the screw rod driving motor 360. Another end of the first screw rod 320 is threaded into the first threaded hole 312. The main shaft 300 is rotatable through the main shaft hole 311. The first screw rod 320 drives the dam-board 310 slides along the main shaft 300.

Figure 7:
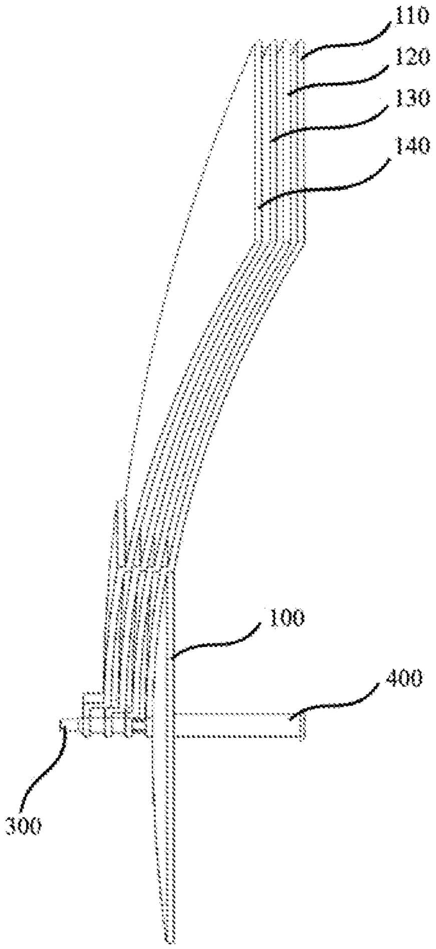
FIG. 7 is the side view of the dish reflector assembly in a folded state.

FIG. 7 is the side view of the dish reflector assembly in a folded state.

Figure 8:
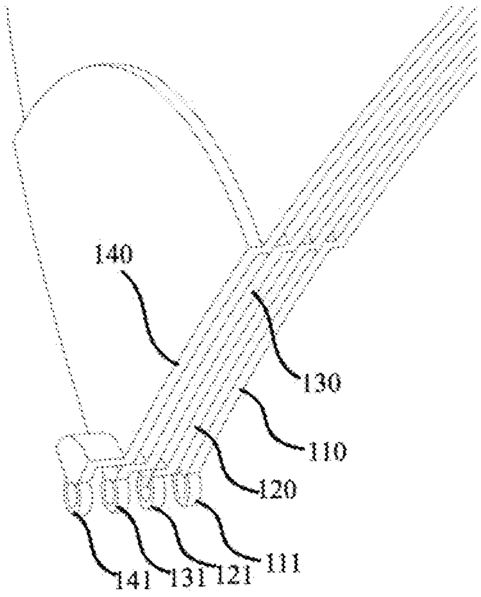
FIG. 8 is a schematic view of the quarter circle shape dish sectors in a folded state.

FIG. 8 is a schematic view of the quarter circle shape dish sectors in a folded state.

The dish reflector assembly 10 has a central disc 100, a first quarter circle shape dish sector 110 with a first ring 111 that matches the diameter of the main shaft 300, a second quarter circle shape dish sector 120 with a second ring 121 that matches the diameter of the main shaft 300, a third quarter circle shape dish sector 130 with a third ring 131 that matches the diameter of the main shaft 300, and a fourth quarter circle shape dish sector 140 with a fourth ring 141 that matches the diameter of the main shaft 300. The central disc 100 is fixed at the second main shaft end 302. The first ring 111 has an internal spline tooth 1111 coupled to the external spline tooth 3021. The second ring 121 has a second pin hole 1211 corresponding the second spring pin 303. The third ring 131 has a third pin hole 1311 corresponding the third spring pin 304. The fourth ring 141 has a fourth pin hole 1411 corresponding the fourth spring pin 305.

The foldable satellite dish has a folded state and a deployed state. In the folded state, the first quarter circle shape dish sector 110, the second quarter circle shape dish sector 120, the third quarter circle shape dish sector 130, and the fourth quarter circle shape dish sector 140 are sequentially arranged along the main shaft 300 between the first barrier panel 211 and the second barrier panel 221. In the deployed state, the second ring 121 is secured to the main shaft 300 by the second spring pin 303, the third ring 131 is secured to the main shaft 300 by the third spring pin 304, the fourth ring 141 is secured to the main shaft 300 by the fourth spring pin 305.

Figure 10A:
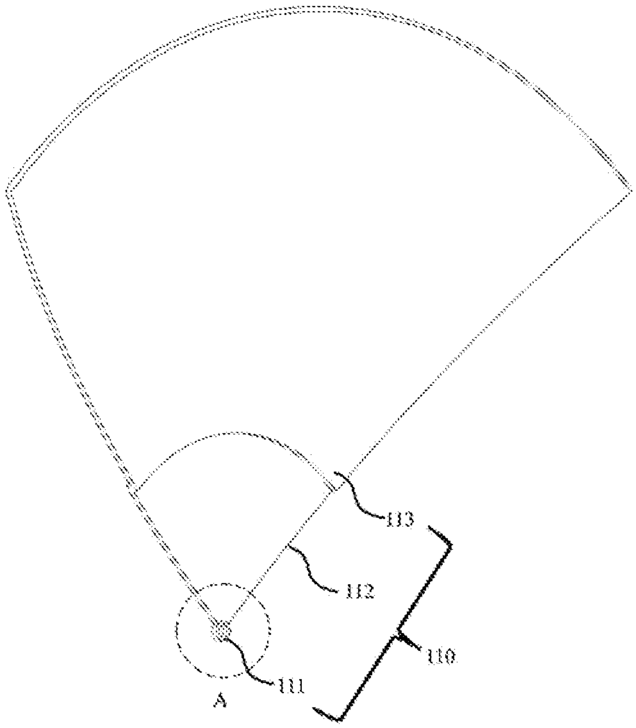
FIG. 10A is a schematic view of the first quarter circle shape dish sector.
Figure 10B:
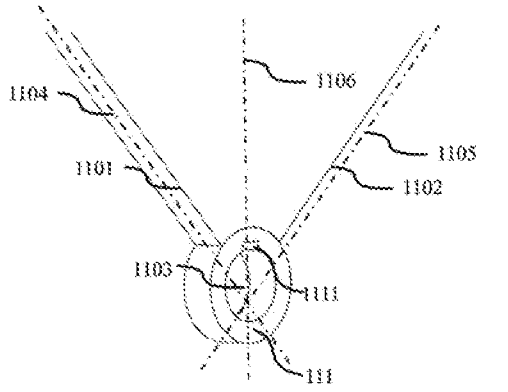
FIG. 10B is an enlarged view of Part A in FIG. 10A.

FIG. 10A is a schematic view of the first quarter circle shape dish sector; FIG. 10B is an enlarged view of Part A in FIG. 10A.

Two edges 1101, 1102 of the first quarter circle shape dish sector 110 define a first pinch angle 1103, bisector of the first pinch angle 1103 passes through the internal spline tooth 1111, and the internal spline tooth 1111 is located on a side of the first ring 111 near the first pinch angle 1103. As shown in FIG. 10B, the first pinch angle 1103 formed by the centerline 1104, 1105 of the two edges 1101, 1102 has a bisector 1106 that passes through the geometric center of internal spline tooth 1111 along the vertical direction.

Figure 11A:
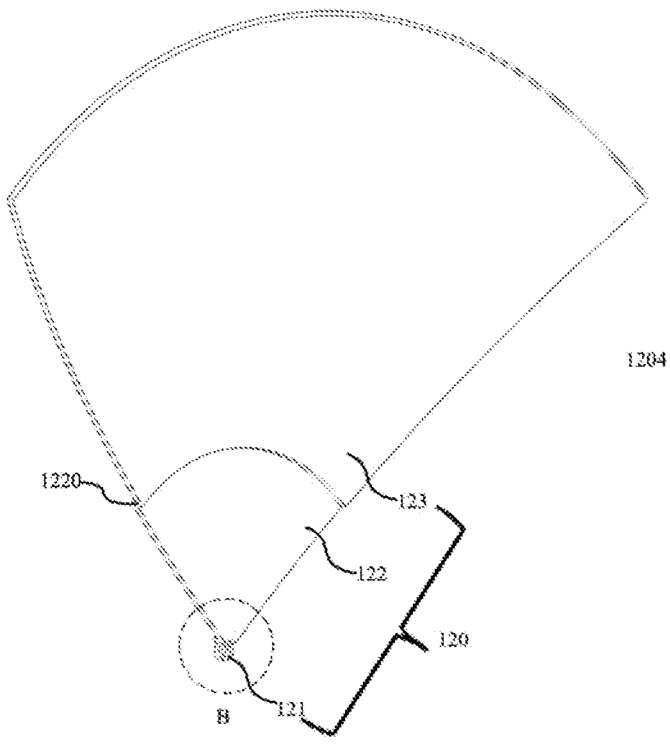
FIG. 11A is a schematic view of the second quarter circle shape dish sector.
Figure 11B:
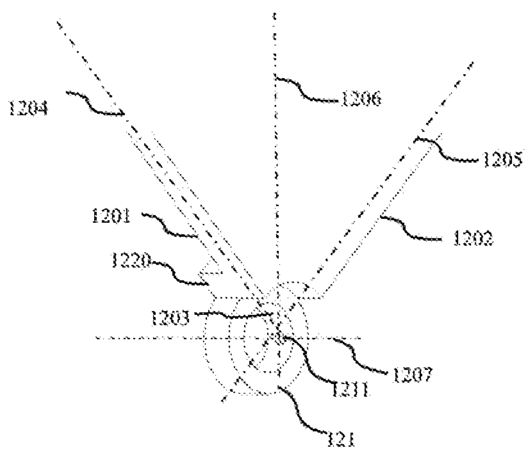
FIG. 11B is an enlarged view of Part B in FIG. 11A.

FIG. 11A is a schematic view of the second quarter circle shape dish sector; FIG. 11B is an enlarged view of Part B in FIG. 11A.

Two edges 1201, 1202 of the second quarter circle shape dish sector 120 define a second pinch angle 1203, and bisector of the second pinch angle 1203 and axis of the second pin hole 1211 form a 90-degree angle.

As shown in FIG. 11B, the second pinch angle 1203 formed by the centerline 1204, 1205 of the two edges 1201, 1202 has a bisector 1206 that is perpendicular to the axis 1207 of the second pin hole 1211. A 90-degree clockwise rotation from bisector 1206 around the vertex of angle 1203 yields a line parallel to axis 1207 of second pinhole 1211.

Figure 12A:
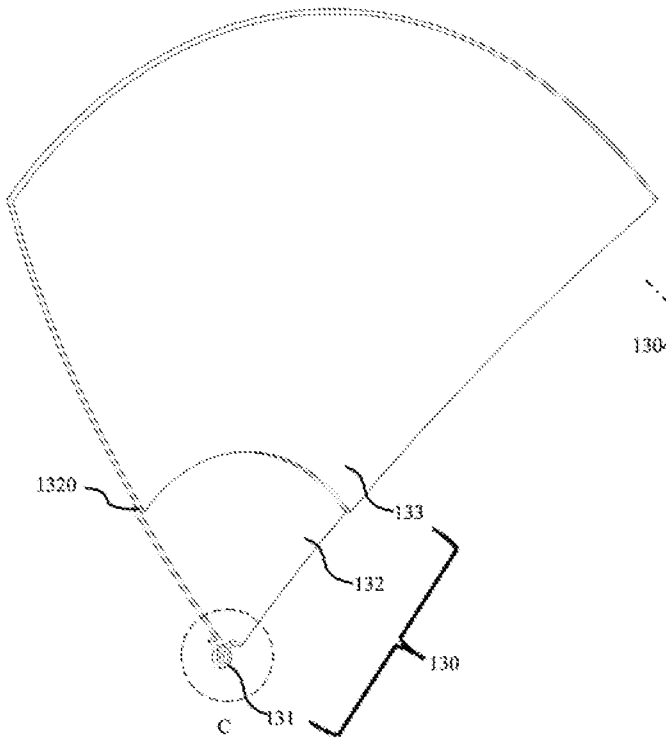
FIG. 12A is a schematic view of the third quarter circle shape dish sector.
Figure 12B:
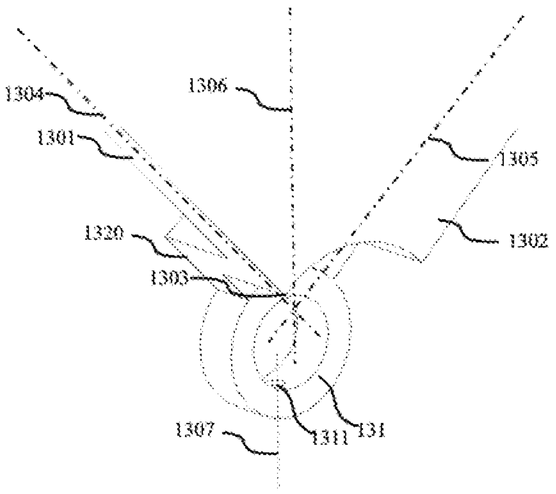
FIG. 12B is an enlarged view of Part C in FIG. 12A.

FIG. 12A is a schematic view of the third quarter circle shape dish sector; FIG. 12B is an enlarged view of Part C in FIG. 12A.

Two edges 1301, 1302 of the third quarter circle shape dish sector 130 define a third pinch angle 1303, bisector of the third pinch angle 1303 is parallel to axis of the third pin hole 1311, and the third pin hole 1311 is located on a side of the third ring 131 away from the third pinch angle 1303.

As shown in FIG. 12B, the third pinch angle 1303 formed by the centerline 1304, 1305 of the two edges 1301, 1302 has a bisector 1306 that is parallel to the axis 1207 of the third pin hole 1311. The third pin hole 1311 is at bottom of the third ring 131.

Figure 13A:
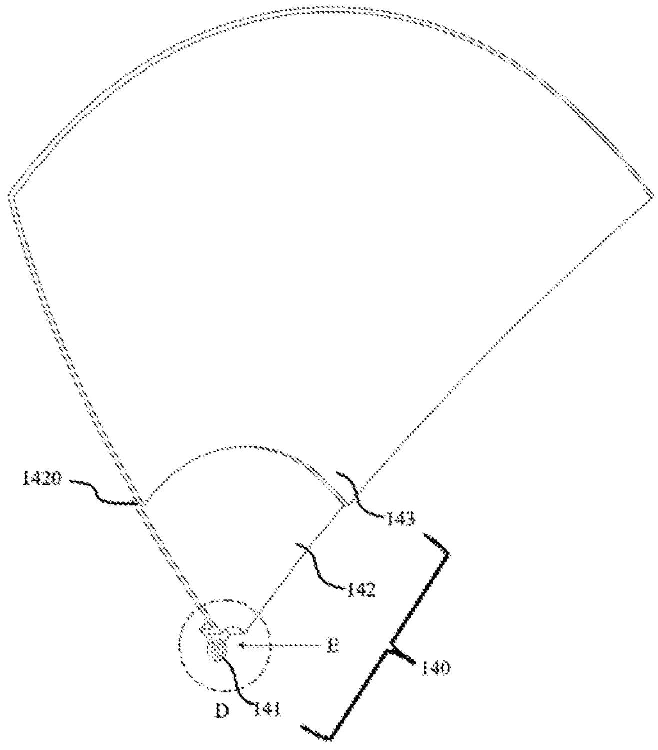
FIG. 13A is a schematic view of the fourth quarter circle shape dish sector.
Figure 13B:
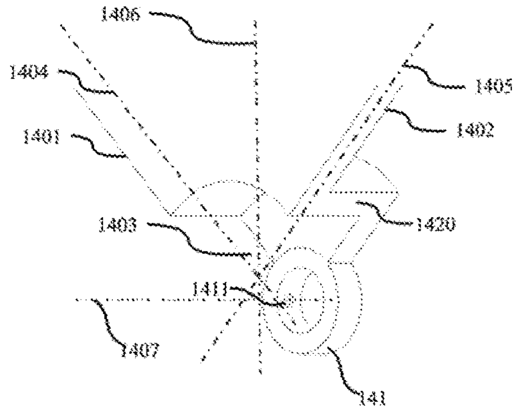
FIG. 13B is an enlarged view of Part D in FIG. 13A.

FIG. 13A is a schematic view of the fourth quarter circle shape dish sector; FIG. 13B is an enlarged view of Part D in FIG. 13A.

Two edges 1401, 1402 of the fourth quarter circle shape dish sector 140 define a fourth pinch angle 1403, and bisector of the fourth pinch angle 1403 and axis of the fourth pin hole 1411 form a 270-degree angle.

As shown in FIG. 13B, the fourth pinch angle 1403 formed by the centerline 1404, 1405 of the two edges 1401, 1402 has a bisector 1406 that is perpendicular to the axis 1407 of the fourth pin hole 1211. A 270-degree clockwise rotation from bisector 1406 around the vertex of angle 1403 yields a line parallel to axis 1407 of the fourth pinhole 1411.

As FIG. 1 shows, and with reference to FIGS. 7-13, in the folded status, all the dish sectors 110, 120, 130, and 140 are stacked between the central disc 100 and the dam-board 310, when viewed from left to right in FIG. 7 (or from the direction along the first main shaft end 301 toward the second main shaft end 302 in FIG. 9), the internal spline tooth 1111 is directly above the main shaft 300, the second pin hole 1211 is on the right side of the main shaft 300, the third pin hole 1311 is directly below the spindle, and the fourth pin hole 1411 is on the left side of the main shaft 300.

Figure 14:
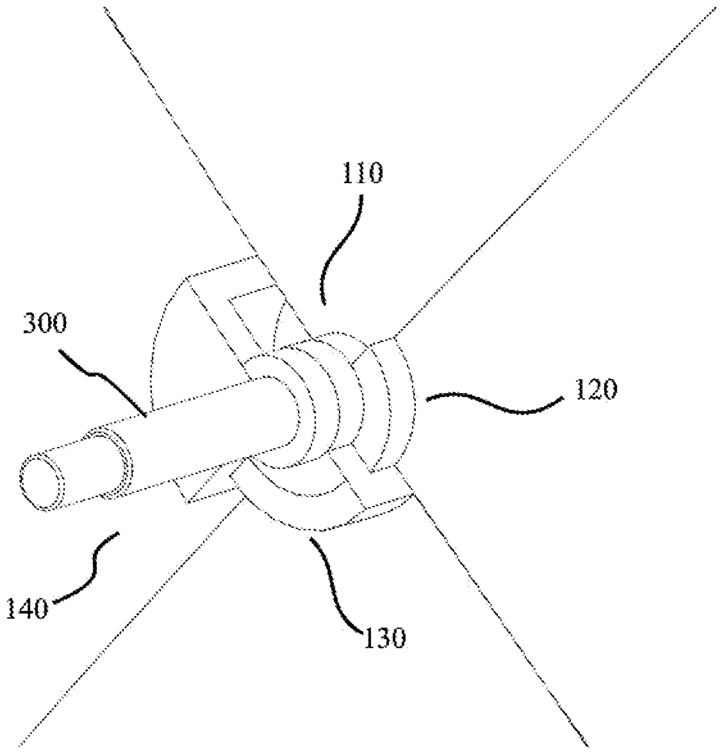
FIG. 14 is a partial schematic view including the main shaft and all the quarter circle shape dish sectors in a deployed state.

FIGS. 7, 8, and 14 show the four quarter circle shape dish sectors are possessed with different profiles (also see FIGS. 10A, 10B, 11A, 11B, 12A, 12B, 13A, and 13B) so as to ensure the high-level plying-up quality under both folded and expanded statuses.

The first quarter circle shape dish sector 110 is stepped and has a first low sector 112 and a first high sector 113. The radius of the first low sector 112 is the same as the radius of the central disc 100. The difference in height between the first high sector 113 and the first low sector 112 is the same as the thickness of the central disc 100.

The second quarter circle shape dish sector 120 is stepped and has a second low sector 122 and a second high sector 123. The radius of the second low sector 122 is the same as the radius of the central disc 100. The difference in height between the second high sector 123 and the second low sector 122 is the same as the thickness of the central disc 100.

The second low sector 122 extends a second sector support protrusion 1220 for the second ring 121 along the main shaft 300 in a direction away from the first quarter circle shape dish sector 110, and the thickness of the second sector support protrusion 1220 is equal to the thickness of the central disc 100.

The inner diameter of the second sector support protrusion 1220 is equal to the outer diameter of the first ring 111.

The third quarter circle shape dish sector 130 is stepped and has a third low sector 132 and a third high sector 133. The radius of the third low sector 132 is the same as the radius of the central disc 100. The difference in height between the third high sector 133 and the third low sector 132 is the same as the thickness of the central disc 100.

The third low sector 132 extends a third sector support protrusion 1320 for the third ring 131 along the main shaft 300 in a direction away from the second quarter circle shape dish sector 120, and the thickness of the third sector support protrusion 1320 is equal to twice the thickness of the central disc 100.

The inner diameter of the third sector support protrusion 1320 is equal to the outer diameter of the second sector support protrusion 1220.

The fourth quarter circle shape dish sector 140 is stepped and has a fourth low sector 142 and a fourth high sector 143. The radius of the fourth low sector 142 is the same as the radius of the central disc 100. The difference in height between the fourth high sector 143 and the fourth low sector 142 is the same as the thickness of the central disc 100.

The fourth low sector 142 extends a fourth sector support protrusion 1420 for the fourth ring 141 along the main shaft 300 in a direction away from the second quarter circle shape dish sector 120, and the thickness of the fourth sector support protrusion 1420 is equal to triple the thickness of the central disc 100.

FIG. 4A illustrates a retainer ring 235 is provided on the third vertical plate 230 extending in direction away from the dam-board 310. The retainer ring 235 and the central through-hole 231 are co-axial, and the first main shaft end 301 rotatably extends through the retainer ring 235.

FIG. 4A illustrates a screw driving gear 3601 is mounted on the shaft of the screw rod driving motor 360, a first screw slave gear 3201 is mounted on the first screw rod 320. The screw driving gear 3601 engages with the first screw slave gear 3201.

FIG. 3 illustrates another embodiment, where a second screw rod through-hole 233 and a third screw rod through-hole 234 are provided on the third vertical plate 230.

The driving mechanism 30 has a second screw rod 330 and a third screw rod 340. The dam-board 310 is provided with a second threaded hole 313 and a third threaded hole 314.

One end of the second screw rod 330 is rotatably mounted in the second screw rod through-hole 233. A second screw slave gear 3301 is mounted on the second screw rod 330. Another end of the second screw rod 330 is threaded into the first threaded hole 312.

One end of the third screw rod 340 is rotatably mounted in the third screw rod through-hole 234. A third screw slave gear 3401 is mounted on the third screw rod 340. Another end of the third screw rod 340 is threaded into the third threaded hole 314.

The first screw rod 320, the second screw rod 330, and the third screw rod 340 drive the dam-board 310 slides along the main shaft 300.

The outer surface of the retainer ring 235 is low frictional. An idler gear 2351 is rotatably mounted on the outer surface of the retainer ring 235. The first screw slave gear 3201 engages with the idler gear 2351. The idler gear 2351 engages with the second screw slave gear 3301 and the third screw slave gear 3401 separately.

A main gear 3011 is mounted on the first main shaft end 301. A main shaft driving gear 3501 is mounted on the shaft of the main driving motor 350, and the main shaft driving gear 3501 engages with the main gear 3011.

Figure 15:
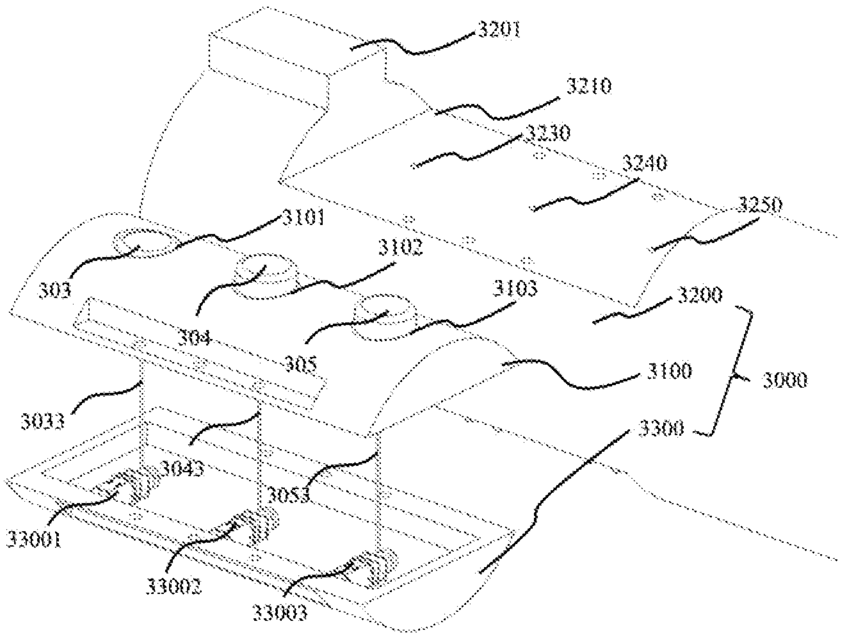
FIG. 15 is a schematic view of the segment of the main shaft near the external spline tooth.

FIG. 15 is a schematic view of the segment of the main shaft near the external spline tooth.

Segment 3000 of the main shaft 300 near the external spline tooth 3021 consists of a pins-holding body 3100, a shaft section body 3200 with a first plane 3210 and a second plane 3220, and a pin motor housing 3300.

Figure 16:
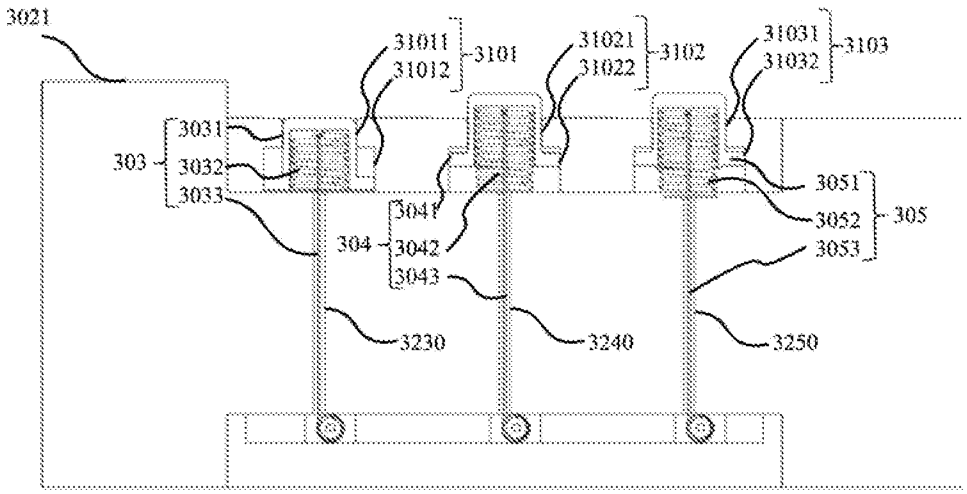
FIG. 16 is an internal view of the segment of the main shaft near the external spline tooth.

FIG. 16 is an internal view of the segment of the main shaft near the external spline tooth.

Figure 17A:
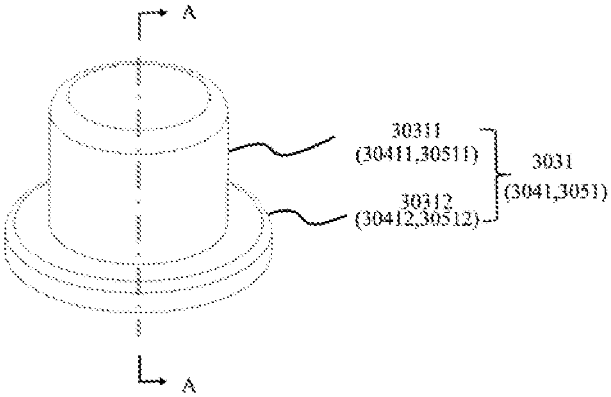
FIG. 17A is a schematic view of the locking cap.
Figure 17B:
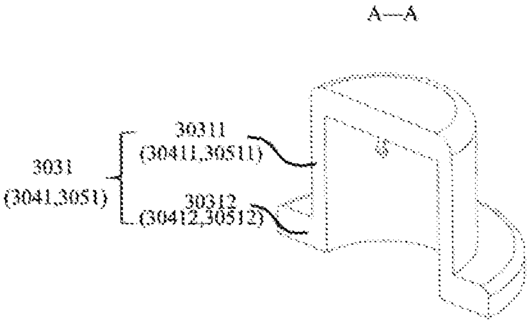
FIG. 17B is an A-A sectional view of the locking cap.

FIG. 17A is a schematic view of the locking cap; FIG. 17B is an A-A sectional view of the locking cap, wherein the second, third, and fourth locking cap 3031, 3041, and 3051 all have the same structure.

The second spring pin 303 has a second locking cap 3031, a second spring 3032, and a second control cable 3033. The second locking cap 3031 has a second hollow cap body 30311 and a second cap seat 30312 extends outward from bottom of the second hollow cap body 30311. The pins-holding body 3100 has a second pin-holding through-hole 3101 has a second upper hole 31011 and a second lower hole 31012. The second spring pin 303 is accommodated in the second pin-holding through-hole 3101. The second upper hole 31011 allows the second hollow cap body 30311 to pass through and prevents the second cap seat 30312 from passing through. The shaft section body 3200 is provided with a second control cable hole 3230 passing through the first plane 3210 and the second plane 3220. The second spring 3032 rests between top of the second locking cap 3031 and the first plane 3210.

Figure 18:
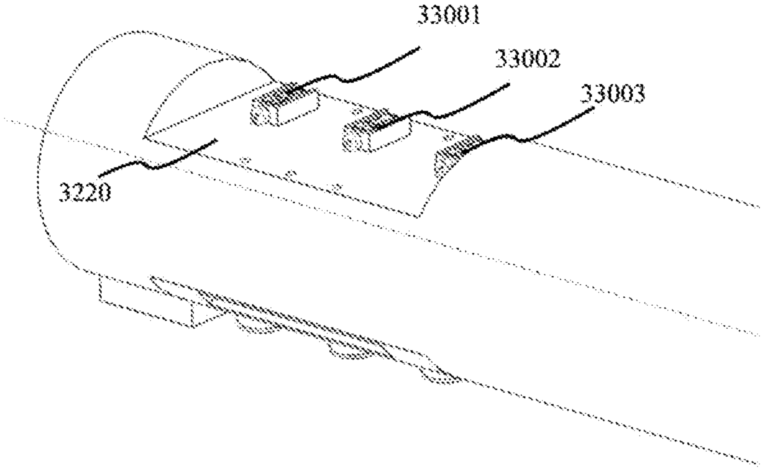
FIG. 18 is a schematic view of the segment of the main shaft near the external spline tooth showing the second plane.

FIG. 18 is a schematic view of the segment of the main shaft near the external spline tooth showing the second plane.

A second control cable motor 33001 is mounted on the second plane 3220 and covered in the pin motor housing 3300. One end of the second control cable 3033 is mounted on the inner top surface of the second locking cap 3031. Another end of the second control cable 3033 passes through the second control cable hole 3230 and is entwined around a spindle of the second control cable motor 33001.

The third spring pin 304 has a third locking cap 3041, a third spring 3042, and a third control cable 3043. The third locking cap 3041 has a third hollow cap body 30411 and a third cap seat 30412 extends outward from bottom of the third hollow cap body 30411. The pins-holding body 3100 has a third pin-holding through-hole 3102 has a third upper hole 31021 and a third lower hole 31022. The third spring pin 304 is accommodated in the third pin-holding through-hole 3102. The third upper hole 31021 allow the third hollow cap body 30411 to pass through and prevents the third cap seat 30412 from passing through. The shaft section body 3200 is provided with a third control cable hole 3240 passing through the first plane 3210 and the second plane 3220. The third spring 3042 rests between top of the third locking cap 3041 and the first plane 3210. A third control cable motor 33002 is mounted on the second plane 3220 and covered in the pin motor housing 3300. One end of the third control cable 3043 is mounted on the inner top surface of the third locking cap 3041. Another end of the third control cable 3043 passes through the third control cable hole 3240 and is entwined around a spindle of the third control cable motor 33002.

The fourth spring pin 305 has a fourth locking cap 3051, a fourth spring 3052, and a fourth control cable 3053. The fourth locking cap 3051 has a fourth hollow cap body 30511 and a fourth cap seat 30512 extends outward from bottom of the fourth hollow cap body 30511. The pins-holding body 3100 has a fourth pin-holding through-hole 3103 has a fourth upper hole and a fourth lower hole. The fourth spring pin 305 is accommodated in the fourth pin-holding through-hole 3103. The fourth upper hole allow the fourth hollow cap body 30511 to pass through and prevents the fourth cap seat 30512 from passing through. The shaft section body 3200 is provided with a fourth control cable hole 3250 passing through the first plane 3210 and the second plane 3220. The fourth spring 3052 rests between top of the fourth locking cap 3051 and the first plane 3210. A fourth control cable motor 33003 is mounted on the second plane 3220 and covered in the pin motor housing 3300. One end of the fourth control cable 3053 is mounted on the inner top surface of the fourth locking cap 3051. Another end of the fourth control cable 3053 passes through the fourth control cable hole 3250 and is entwined around a spindle of the fourth control cable motor 33003.

FIGS. 19A, 20A, 21A, and 22A are schematic views illustrating the device unfolding from a fully folded state to a fully deployed state. FIGS. 19B, 20B, 21B, 22B, and 22C illustrate the state of the main shaft in the corresponding state.

The foldable satellite dish has two stepper motors, the main driving motor 350 and the screw rod driving motor 360. The main driving motor 350 controls the rotation of the main shaft 300 (and then the four quarter circle shape dish sector sectors 110, 120, 130, and 140). The screw rod driving motor 360 drives the rotation of three surrounding screw rods 320, 330, and 340 around the main shaft 300 in order to control the push/pull motion of a dam-board 310.

The rotations of three screw rods 320, 330, and 340 are in the same direction due to the gear set arrangement and will drive the moving forward and backward of the dam-board 310 smoothly. The dam-board 310 will push the dish sectors 110, 120, 130, and 140 forward during the deploying process, and as a barrier upon release.

Figure 19A:
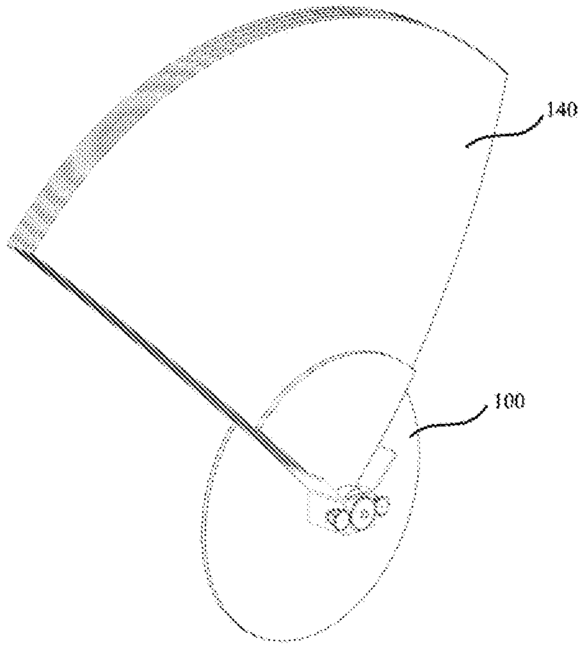
FIG. 19A is a schematic view of the invention in a folded state.
Figure 19B:
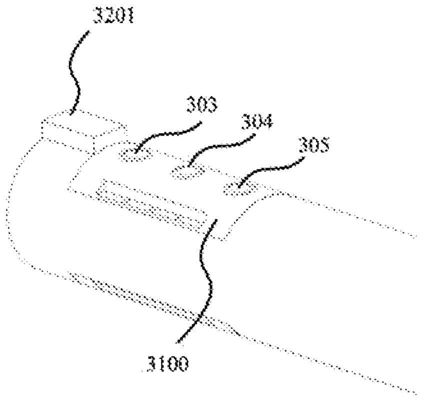
FIG. 19B illustrates the corresponding state of the main shaft in the same state.

As FIGS. 19A and 19B show, in the folded status (first step), all the dish sectors 110, 120, 130, and 140 are stacked between the central disc 100 and the dam-board 310, where the dish sector 110 is fixed to the main shaft 300 by the spline connection and is affixed to the central disc 100. The second, third and fourth control cable motors 33001, 33002, and 33003 pull the second, third, and fourth control cables 3033, 3043, and 3053 to overcome the elastic force of the second, third, and fourth springs 3032, 3033, and 3034. At this stage, all the spring pins 303, 304, and 305 are retracted into the pins-holding body 3100. The dish sectors 120, 130, and 140 can move along the main shaft 300 freely between the first dish sector 110 and the dam-board 310. To avoid the damage caused by the sectors hitting each other, the dam-board is used to limit the movement of the dish sectors 120, 130, and 140.

Figure 20A:
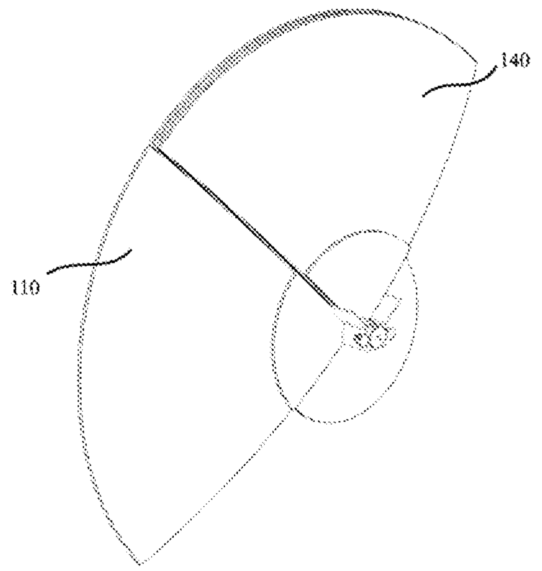
FIG. 20A is a schematic view of the invention in the state that the first and second quarter circle shape dish sectors are deployed.
Figure 20B:
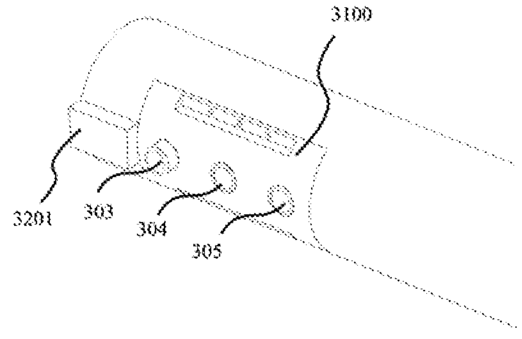
FIG. 20B illustrates the corresponding state of the main shaft in the same state.

As FIGS. 20A and 20B show, in the second step, the main shaft 300 rotates 90 degrees, and the first sector 110 rotates 90 degrees subsequently. At this stage, the dish sectors 120, 130, and 140 are stacked between the central disc 100 and the dam-board 310. The dam-board will be driven and push sectors 120, 130, and 140 until sector 120 is affixed to the central disc 100. At this stage, the third, and fourth control cable motors 33002, and 33003 pull the third, and fourth control cables 3043, and 3053 to overcome the elastic force of the third, and fourth springs 3033, and 3034; the second control cable motor 33001 releases the second control cable 3033 and let the second spring pin 303 pop up to secure sector 120. Spring pins 304, and 305 keep remaining in the pins-holding body 3100.

Figure 21A:
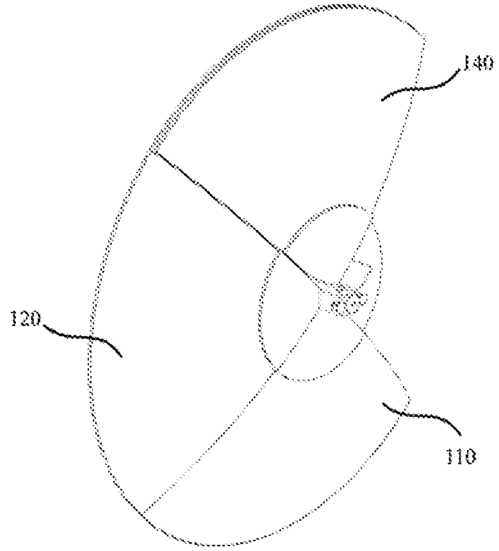
FIG. 21A is a schematic view of the invention in the state that the first, second, and third quarter circle shape dish sectors are deployed.
Figure 21B:
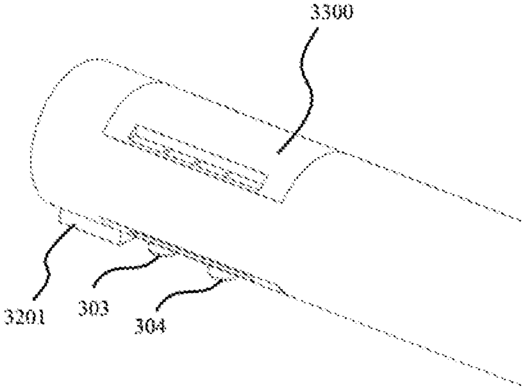
FIG. 21B illustrates the corresponding state of the main shaft in the same state.

As FIGS. 21A and 21B show, in the third step, the main shaft 300 rotates 90 more degrees, and the first and second sectors 110, and 120 rotate 90 more degrees subsequently. At this stage, the dish sectors 130, and 140 are stacked between the central disc 100 and the dam-board 310. The dam-board 310 will be driven and push sectors 130, and 140 until sector 130 is affixed to the central disc 100. At this stage, the fourth control cable motor 33003 pull the fourth control cable 3053 to overcome the elastic force of the fourth spring 3034; the second and third control cable motor 33001, and 33002 release the second and third control cable 3033, and 3043 to let the second and third spring pins 303, and 304 pop up to secure sectors 120 and 130. Spring pin 305 keeps remaining in the pins-holding body 3100.

Figure 22A:
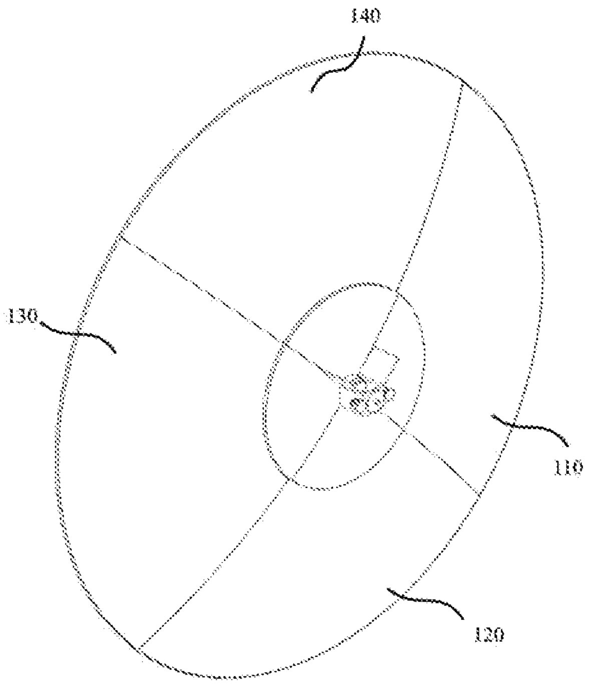
FIG. 22A is a schematic view of the invention in the state that all the quarter circle shape dish sectors are deployed.
Figure 22B:
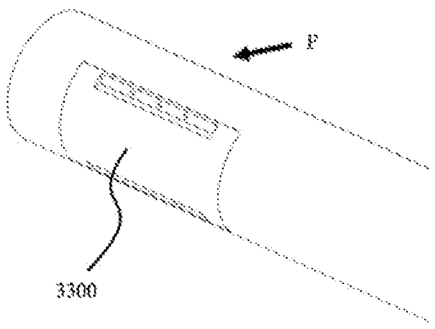
FIG. 22B illustrates the corresponding state of the main shaft in the same state.
Figure 22C:
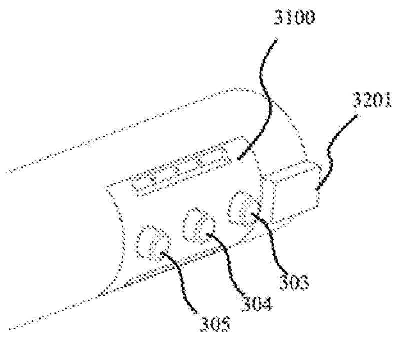
FIG. 22C illustrates the corresponding schematic view of the main shaft from the E direction.

As FIGS. 22A and 22B show, in the final step, the main shaft 300 rotates 90 more degrees, and the first, second, and third sectors 110, 120, and 130 rotate 90 more degrees subsequently. At this stage, the dish sector 140 is between the central disc 100 and the dam-board 310. The dam-board 310 will be driven and push sector 140 until sector 140 is affixed to the central disc 100. At this stage, all the control cable motors 33001, 33002, and 3003 release all the control cables 3033, 3043, and 3053 to let all the spring pins 303, 304, and 305 pop up to secure all the sectors 120, 130, and 140.

This deploying and folding system is intended to work together with any angling and positioning system installed on the top of the potential facility (e.g., RV and mobile home) to achieve the best signal intensity. Although the deploying and folding system of the present invention can be activated in various angles and positions, such motions are preferably performed in a horizontal position.

As FIG. 7 shows, a retractable rod 400 is coaxially mounted on a side of the central disc 100 away from the support housing 20.

In another embodiment, the second control cable motor 33001, the third control cable motor 33002, and the fourth control cable motor 33003 are miniature dc motors.

In another embodiment, the satellite dish structure can also be utilized as a solar cooker under emergency circumstances for travelers off the grid after its inner surface is modified or coated with reflective materials like aluminum foil and magnesium oxide.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

Except as otherwise stated immediately above, nothing that has been stated or illustrated is intended or should be interpreted to cause a dedication of any component, step, feature, object, benefit, advantage, or equivalent to the public, regardless of whether it is recited in the claims.

The terms and expressions used herein have the ordinary meaning accorded to such terms and expressions in their respective areas, except where specific meanings have been set forth. Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element proceeded by "a" or "an" does not, without further constraints, preclude the existence of additional elements of the identical type.

What is claimed is:

1. A foldable satellite dish, comprising a dish reflector assembly, a support housing, and a driving mechanism; wherein, the support housing comprises a bottom plate; a first vertical plate extends upward from a first edge of the bottom plate; a first barrier panel extends from the first vertical plate; a second vertical plate opposing the first vertical plate extends upward from a second edge of the bottom plate; a second barrier panel extends from the second vertical plate; the first barrier panel is perpendicular to the second barrier panel; a third vertical plate extends upward from a third edge of the bottom plate; a central through-hole is provided on the third vertical plate; a first screw rod through-hole is provided on the third vertical plate;

the driving mechanism comprises a main shaft, a dam-board, a first screw rod, a main driving motor, and a screw rod driving motor; a first main shaft end is rotatably mounted in the central through-hole and driven by the main driving motor; a second main shaft end is provided with a first external spline tooth; a second spring pin, a third spring pin, and a fourth spring pin are provided sequentially on the main shaft near the first external spline tooth; the dam-board is provided with a main shaft hole and a first threaded hole; one end of the first screw rod is rotatably mounted in the first screw rod through-hole and driven by the screw rod driving motor; another end of the first screw rod is threaded into the first threaded hole; the main shaft is rotatable through the main shaft hole; the first screw rod drives the dam-board slides along the main shaft; and the dish reflector assembly comprises a central disc, a first quarter circle shape dish sector with a first ring that matches diameter of the main shaft, a second quarter circle shape dish sector with a second ring that matches diameter of the main shaft, a third quarter circle shape dish sector with a third ring that matches diameter of the main shaft, and a fourth quarter circle shape dish sector with a fourth ring that matches diameter of the main shaft; the central disc is fixed at the second main shaft end; the first ring has an internal spline tooth coupled to the first external spline tooth; the second ring has a second pin hole corresponding the second spring pin; the third ring has a third pin hole corresponding the third spring pin; the fourth ring has a fourth pin hole corresponding the fourth spring pin;

wherein, the foldable satellite dish has a folded state and a deployed state; in the folded state, the first quarter circle shape dish sector, the second quarter circle shape dish sector, the third quarter circle shape dish sector, and the fourth quarter circle shape dish sector are sequentially arranged along the main shaft between the first barrier panel and the second barrier panel; in the deployed state, the second ring is secured to the main shaft by the second spring pin, the third ring is secured to the main shaft by the third spring pin, the fourth ring is secured to the main shaft by the fourth spring pin.

2. The foldable satellite dish of claim 1, wherein, two edges of the first quarter circle shape dish sector define a first pinch angle, bisector of the first pinch angle passes through the internal spline tooth, and the internal spline tooth is located on a side of the first ring near the first pinch angle;

two edges of the second quarter circle shape dish sector define a second pinch angle, and bisector of the second pinch angle and axis of the second pin hole form a 90-degree angle;

two edges of the third quarter circle shape dish sector define a third pinch angle, bisector of the third pinch angle is parallel to axis of the third pin hole, and the third pin hole is located on a side of the third ring away from the third pinch angle;

two edges of the fourth quarter circle shape dish sector define a fourth pinch angle, and bisector of the fourth pinch angle and axis of the fourth pin hole form a 270-degree angle.

3. The foldable satellite dish of claim 1, wherein, the first quarter circle shape dish sector is stepped and comprises a first low sector and a first high sector; radius of the first low sector is same as radius of the central disc; difference in height between the first high sector and the first low sector is same as thickness of the central disc.

4. The foldable satellite dish of claim 3, wherein, the second quarter circle shape dish sector is stepped and comprises a second low sector and a second high sector; radius of the second low sector is same as radius of the central disc; difference in height between the second high sector and the second low sector is same as thickness of the central disc; and, the second low sector extends a second sector support protrusion for the second ring along the main shaft in a direction away from the first quarter circle shape dish sector, and thickness of the second sector support protrusion is equal to thickness of the central disc.

5. The foldable satellite dish of claim 4, wherein, inner diameter of the second sector support protrusion is equal to outer diameter of the first ring.

6. The foldable satellite dish of claim 4, wherein, the third quarter circle shape dish sector is stepped and comprises a third low sector and a third high sector; radius of the third low sector is same as radius of the central disc; difference in height between the third high sector and the third low sector is same as thickness of the central disc;

the third low sector extends a third sector support protrusion for the third ring along the main shaft in a direction away from the second quarter circle shape dish sector, and thickness of the third sector support protrusion is equal to twice thickness of the central disc.

7. The foldable satellite dish of claim 6, wherein, inner diameter of the third sector support protrusion is equal to outer diameter of the second sector support protrusion.

8. The foldable satellite dish of claim 6, wherein, the fourth quarter circle shape dish sector is stepped and comprises a fourth low sector and a fourth high sector; radius of the fourth low sector is same as radius of the central disc; difference in height between the fourth high sector and the fourth low sector is same as thickness of the central disc;

the fourth low sector extends a fourth sector support protrusion for the fourth ring along the main shaft in a direction away from the second quarter circle shape dish sector, and thickness of the fourth sector support protrusion is equal to triple thickness of the central disc.

9. The foldable satellite dish of claim 1, wherein, a retainer ring is provided on the third vertical plate extending in direction away from the dam-board; the retainer ring and the central through-hole are co-axial, the first main shaft end rotatably extends through the retainer ring.

10. The foldable satellite dish of claim 9, wherein, a second screw rod through-hole and a third screw rod through-hole are provided on the third vertical plate;

the driving mechanism comprises a second screw rod and a third screw rod; the dam-board is provided with a second threaded hole and a third threaded hole;

one end of the second screw rod is rotatably mounted in the second screw rod through-hole; a second screw slave gear is mounted on the second screw rod; another end of the second screw rod is threaded into the first threaded hole;

one end of the third screw rod is rotatably mounted in the third screw rod through-hole; a third screw slave gear is mounted on the third screw rod; another end of the third screw rod is threaded into the third threaded hole;

the first screw rod, the second screw rod, and the third screw rod drive the dam-board slides along the main shaft; and, outer surface of the retainer ring is low frictional; an idler gear is rotatably mounted on the outer surface of the retainer ring; a first screw slave gear is mounted on the first screw rod; the first screw slave gear engages with the screw driving gear and the idler gear separately; the idler gear engages with the second screw slave gear and the third screw slave gear separately.

11. The foldable satellite dish of claim 9, wherein, a main gear is mounted on the first main shaft end; a main shaft driving gear is mounted on shaft of the main driving motor, and the main shaft driving gear engages with the main gear.

12. The foldable satellite dish of claim 1, wherein, a screw driving gear is mounted on shaft of the screw rod driving motor, a first screw slave gear is mounted on the first screw rod; the screw driving gear engages with the first screw slave gear.

13. The foldable satellite dish of claim 1, wherein, a segment of the main shaft near the first external spline tooth comprises a pins-holding body, a shaft section body with a first plane and a second plane, and a pin motor housing;

the second spring pin comprises a second locking cap, a second spring, and a second control cable; the second locking cap comprises a second hollow cap body and a second cap seat extends outward from bottom of the second hollow cap body; the pins-holding body has a second pin-holding through-hole comprises a second upper hole and a second lower hole; the second spring pin is accommodated in the second pin-holding through-hole; the second upper hole allow the second hollow cap body to pass through and prevents the second cap seat from passing through; the shaft section body is provided with a second control cable hole passing through the first plane and the second plane; the second spring rests between top of the second locking cap and the first plane; a second control cable motor is mounted on the second plane and covered in the pin motor housing; one end of the second control cable is mounted on inner top surface of the second locking cap; another end of the second control cable passes through the second control cable hole and is entwined around a spindle of the second control cable motor;

the third spring pin comprises a third locking cap, a third spring, and a third control cable; the third locking cap comprises a third hollow cap body and a third cap seat extends outward from bottom of the third hollow cap body; the pins-holding body has a third pin-holding through-hole comprises a third upper hole and a third lower hole; the third spring pin is accommodated in the third pin-holding through-hole; the third upper hole allow the third hollow cap body to pass through and prevents the third cap seat from passing through; the shaft section body is provided with a third control cable hole passing through the first plane and the second plane; the third spring rests between top of the third locking cap and the first plane; a third control cable motor is mounted on the second plane and covered in the pin motor housing; one end of the third control cable is mounted on inner top surface of the third locking cap; another end of the third control cable passes through the third control cable hole and is entwined around a spindle of the third control cable motor;

the fourth spring pin comprises a fourth locking cap, a fourth spring, and a fourth control cable; the fourth locking cap comprises a fourth hollow cap body and a fourth cap seat extends outward from bottom of the fourth hollow cap body; the pins-holding body has a fourth pin-holding through-hole comprises a fourth upper hole and a fourth lower hole; the fourth spring pin is accommodated in the fourth pin-holding through-hole; the fourth upper hole allow the fourth hollow cap body to pass through and prevents the fourth cap seat from passing through; the shaft section body is provided with a fourth control cable hole passing through the first plane and the second plane; the fourth spring rests between top of the fourth locking cap and the first plane; a fourth control cable motor is mounted on the second plane and covered in the pin motor housing; one end of the fourth control cable is mounted on inner top surface of the fourth locking cap; another end of the fourth control cable passes through the fourth control cable hole and is entwined around a spindle of the fourth control cable motor.

14. The foldable satellite dish of claim 1, wherein, a retractable rod is coaxially mounted on a side of the central disc away from the support housing.

15. The foldable satellite dish of claim 13, wherein, the second control cable motor, the third control cable motor, and the fourth control cable motor are miniature DC motors.

* * * * *